INVENTORS
HOWARD RICHARD LINTON
EDWARD F. KLENKE, JR.

ATTORNEY 3,372,047
Patented Mar. 5, 1968

3,372,047
COLOR STABILIZED MICA
Howard Richard Linton, Scotch Plains, and Edward F. Klenke Jr., Liberty Corner, N.J., assignors to E. I. du Pont de Nemours and Company, Wilmington, Del., a corporation of Delaware
Filed Oct. 11, 1965, Ser. No. 494,395
9 Claims. (Cl. 106—291)

ABSTRACT OF THE DISCLOSURE

Stabilization of mica to inhibit discoloration on subjection of the mica to calcination at 600–1000° C. or on employment as a substrate in nacreous pigment manufacture in which the mica is coated with a metal oxide ($TiO_2$, $ZrO_2$, $Fe_2O_3$, etc.), such stabilization being effected by directly mixing the mica prior to calcination with from 1–50% and preferably from 5–10%, by weight, calculated as $Al_2O_3$, of an aluminum compound (an oxide, silicate, sulfate, and halide).

Figure 1:
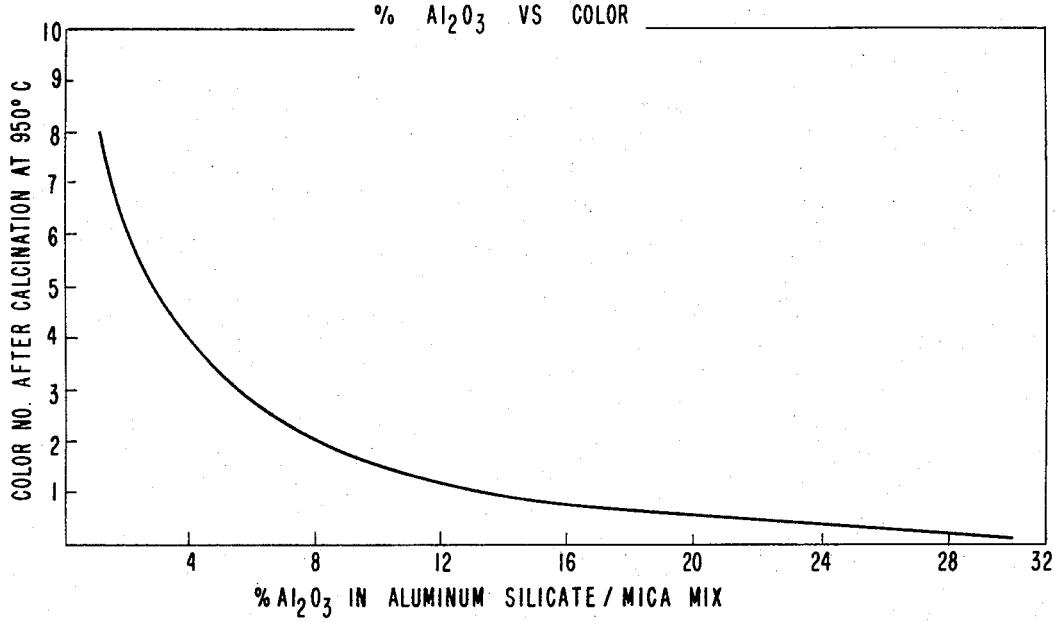

This invention relates to the stabilization of natural mica against color change on heating, and to novel methods for controlling its color characteristics during calcination thereof as an essential component in a pigmenting composition. More particularly, it relates to a highly useful method of inhibiting and controlling undesired mica color change during stabilization, through calcination, of nacreous pigments containing a micaceous substrate and a coating of a translucent layer of metal oxide.

Nacreous pigments, the color of which results from light interference effects produced by a translucent layer of a metal oxide or hydroxide deposited on the surface of a flaky substrate such as mica, are well known. They can be prepared as described in U.S. Patents 3,087,828 and 3,087,829. In their production controlled deposition is brought about of a thin, adherent, non-opaque translucent layer of an oxide of titanium, zirconium, iron, chromium or the like, substantially all of the particles of which layer are less than 0.1 micron, onto the surface of mica as a translucent flake substrate. Thus, for example, a pale gold colored flake pigment is obtained by uniformly precipitating hydrated $TiO_2$ through hydrolysis of a titanium salt solution, such as titanyl sulfate, onto the mica surface and in the mount of about 0.11 gram of hydrated $TiO_2$ per square meter of mica surface. As the thickness of the interference-producing layer of metal oxide or hydroxide on the substrate progressively increases, the observed color of the coated flake pigment obtained varies in sequence from silver to gold, red violet, blue, green and then to gold again, following which the color sequence is repeated. Products of technical merit usually range from 30 to 200 millimicrons but generally can range from 20 to 250 millimicrons in the calculated geometric thickness of the oxide layer. When dispersed in coating compositions or other systems, these pigments provide novel color effects, including brilliant lustre. When viewed at the specular angle of bright illumination, a striking irridescent sparkle on a background of a predominating color becomes evident.

Calcination of the coated flake pigment composition at suitable (700–1000° C.) temperatures advantageously stabilizes the pigment against light sensitivity and converts the hydroxide layer to the corresponding metal oxide. In addition to improving lightfastness, beneficial improvements are also obtained in respect to increasing the depth of color of the pigment and decreasing its chemical sensitivity. However, this calcination treatment has been found to induce an undesired variance, and to a large extent unpredictable, color change in the natural mica substrate whereby control of pigment color within desired limits becomes very difficult.

Commercial white, wet-ground naturally occurring mica, such as is commonly used as a pigment substrate or extender in the paint industry, usually contains relatively small amounts of iron, manganese, and other metals, the oxides of which are colored. In its normal use as a paint extender, the mica is easily standardized for color. However, under relatively high (600–1000° C.) temperatures its color markedly alters through darkening, the degree of darkening being generally related to the content of metallic ingredients such as iron, manganese, etc. The depth of colored developed during calcination is roughly proportional to the temperature employed, and in the range of practical operation a deviation of ±25° C. can be very significant in determining the ultimate color of the mica. Therefore, in any operation involving the calcination of mica at such elevated temperatures, the ease of color standardization of the final product will depend directly on the degree of control of the effective operating temperature of the calciner. As will be evident to those familiar with the operation of rotary kilns, or similar equipment used in the commercial calcination of $TiO_2$, exerting accurate control over operating temperatures presents a problem.

This problem of color standardization of calcined mica carries over into color control of nacreous flake pigments prepared by calcining mica coated with a layer of a hydrous oxide of a metal, such as titanium, zirconium, etc. The degree to which the color of such composite pigments becomes altered because of change in chemical composition of the mica during calcination, will depend in part on the optical character of the oxide coating. If the selection of the latter is such as to promote the attainment of maximum nacreous character, sparkle, lustre, etc., then the thickness and the opacity of the oxide coating must be reduced to a minimum consistent with the achievement of the desired color, that is, insofar as possible, permit ready passage of light rays therethrough. Obviously, this condition will likewise permit the substrate to exert its maximum effect on the color of the ultimate coated flake pigment. Thus, all problems related to the fundamental control of color of the calcined mica substrate per se must ultimately be manifest in the color control of the calcined oxide-coated mica flake pigments.

It is among the objects of this invention to overcome the above and other disadvantages arising when calcination is undertaken of naturally occurring mica alone or mica-containing pigmenting compositions and to provide novel methods and means for attaining these objects. Particular objects include the provision of useful means for controlling or inhibiting the discoloration arising from heating natural occurring mica and mica-containing pigments whereby the standardization of pigment compositions can be duly facilitated and dependence of the manufacturer on selected mica supplies for effecting such pigment production can be eliminated. Further objects are to provide novel methods and means for preparing improved nacreous pigments on a natural mica base and to obviate the need for careful selection of the substrate to insure attainment of desired pigment color characteristics. Other objects and advantages of the invention will be apparent from the ensuing description and specific examples which are not to be construed as limiting the underlying principles and scope of the invention.

In accordance with this invention the objectionable tendency of naturally occurring mica or nacreous pigments containing such mica to darken on calcination can be effectively remedied if prior to calcination from about 1% to 50%, and preferably from about 5% to 10% (calculated on the basis of $Al_2O_3$ equivalent) by weight of the mica present, of a compound of aluminum, such as oxide, silicate, sulfate or halide, is mixed with the mica or mica-containing nacreous pigment and the calcination is then conducted in the presence of said compound. More specifically it has been discovered that when mica after coating with a thin layer of a metal oxide or hydroxide in accordance with the teachings of U.S. Patents 3,087,828 and 3,087,829 is treated with an aluminum compound prior to calcination of the flake product the color developed on calcination of the thus treated nacreous pigment will be effectively controlled and within the limits desired. Alternatively, and more especially in instances where the aluminum compound is of relatively low solubility in water, (e.g. the oxide or silicate) the coating operation may be performed on the mixed slurry of the mica plus the aluminum compound. In either case, the mica or mica-containing flake pigment obtained from the calcination will advantageously fail to exhibit the undesired discoloration previously encountered when such products are heat treated in the absence of the added aluminum compound.

In one specific embodiment of the invention, equal parts by weight of aluminum oxide and water ground white mica (such as is derived from green muscovite) are suitably mixed and then calcined at 950° C. The product, after cooling, is much lighter in color than the corresponding mica similarly treated without the added aluminum oxide or to which has been added an equal weight of another pigment extender, such as barium sulfate or silica. Likewise, the product resulting from the calcination of a mixture of aluminum oxide and water ground white mica is remarkably lighter than the corresponding mixture of the separately calcined components.

In a further specific embodiment, a mixture of 80 parts of water ground mica above mentioned and 20 parts of aluminum oxide is slurried in water. The suspension is coated with hydrous titanium dioxide in accordance with the methods disclosed in U.S. 3,087,828. The coated flake pigment is then isolated by filtration, washing and drying, and then is calcined at 900° C. The resulting product comprises an attractive nacreous type pigment, much whiter than the counterpart from which aluminum oxide use and presence are omitted.

The improved mica-containing flake pigments, and color stable mica substrate per se thus obtained, are highly useful as ingredients in various pigmenting applications, including paints, printing inks, plastic films, rubber articles, and other compositions wherein they impart desired color and unusual decorative effects, which, if desired, can be emphasized by suitable embossing. In addition, they advantageously exert a profound influence on the durability of the resulting compositions on exposure to the elements.

To a clearer understanding of the invention the following examples are given which are merely illustrative and not in limitation of the invention. Unless otherwise indicated, all parts given are by weight and all mesh sizes mentioned are based on the U.S. standard screen scale.

EXAMPLE I

An intimate mixture of 80 parts of wet ground mica and 20 parts of aluminum silicate pigment was prepared and then heated at 950° C. in air for 30 minutes in a conventional type calciner. The cooled product recovered from such calcination, when compared with a calcined counterpart mica but in which aluminum silicate was not present during the calcination, was much whiter and showed only negligible color change by comparison with the control.

EXAMPLE II

The procedure of Example I was repeated but the ratios of aluminum silicate to mica were varied. In each case the mixture was heated at 950° C. for 30 minutes and the color change assessed after the recovered product had been cooled. The color change on calcination was graded numerically by assigning a rating of 10 to the darkened, untreated mica, and a value of 0 to indicate no detectable color change took place, with the intervening numbers designating intermediate degrees of darkening. In the following table and in the accompanying graph (FIGURE 1) the dependence of the color change on the proportion of aluminum silicate (expressed as percent $Al_2O_3$) in the mix is illustrated:

| Percent $Al_2O_3$ in mix: | Color after calcination |
|---|---|
| 0 | 10 |
| 1 | 8 |
| 2 | 6 |
| 4 | 4 |
| 6 | 2.5 |
| 10 | 1.5 |
| 20 | 0.5 |
| 30 | 0.2 |

EXAMPLE III

Figure 2:
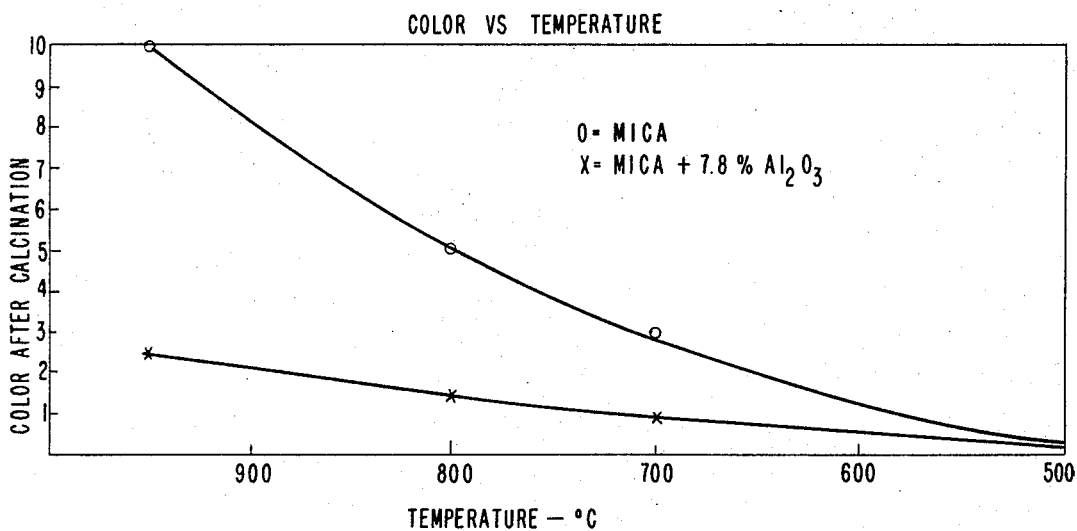

A mixture of 80 parts of wet ground mica and 20 parts of aluminum silicate pigment (equivalent to 7.8% $Al_2O_3$, based on 38.8% $Al_2O_3$ content of the pigment) was calcined for 30 minutes at the temperatures specified in the table below. For purposes of comparison, an untreated mica was similarly calcined. The dependence of the color change on the temperature of calcination and the remarkable inhibitory effect of the added aluminum silicate are illustrated in such table and in the accompanying graph (FIGURE 2):

| Temperature of Calcination, ° C. | Color Rating | |
|---|---|---|
| | Untreated Mica (Control) | Mica plus 7.8% $Al_2O_3$ (as $Al_2(SiO_3)_3$) |
| 500 | 0.2 | 0.2 |
| 700 | 3 | 1 |
| 800 | 5 | 2 |
| 950 | 10 | 2.5 |

EXAMPLE IV

The procedure of Example I was repeated, except that the following aluminum compounds were used in lieu of the aluminum silicate employed in that example, the proportion of aluminum oxide (calculated from the composition) to the mica being constant:

China clay ($Al_2O_3 \cdot 2H_2O \cdot 2SiO_2$)
Boehmite Colloidal aluminum oxide
Gibbsite $Al_2O_3 \cdot 3H_2O$
Aluminum sulfate [$Al_2(SO_4)_3 \cdot 18H_2O$]
Aluminum chloride, anhydrous In each case the degree of color change was found to be essentially the same and equal to that obtained with aluminum silicate use and that these aluminum compounds prove equally effective for inhibiting undesired discoloration of mica on its calcination.

EXAMPLE V

A mixture of 80 parts of water-ground mica (prepared from natural green muscovite and marketed under the trade name "Concord Wet Ground Mica #200/325") and 20 parts of china clay was slurried in 250 parts of water. The mica had a specific surface of about 3.3 square meters per gram, as determined by krypton adsorption in the well-known BET method; all of it passed through a 200-mesh screen, and about 94% thereof through a 325-mesh screen. Its average particle size was in the range of 20–40 microns in maximum dimension and about 0.1 micron in thickness. The slurry was heated to 60° C., and to it was added in 5 minutes 680 parts of an aqueous solution of titanyl sulfate containing 4.4% $TiO_2$ by analysis (equivalent to 30 parts of $TiO_2$). The agitated slurry was heated to the boil and maintained at this temperature for 2½ hours, whereupon it was filtered and washed free of sulfate ions. The wet presscake or the dried product was then calcined at 950° C. for 1 hour. The pigment obtained shows a pleasing slivery nacreous finish. When compared with counterpart pigments but prepared without the use of china clay or with an equal amount of barium sulfate substituted for the china clay, it was found to be much whiter and exhibited better hiding power than such counterparts.

EXAMPLE VI

The procedure of Example V was repeated, but an equivalent amount of aluminum silicate was substituted for the china clay used in that example. Two lots of selected mica were employed. One, prepared from a green muscovite, showed marked darkening when calcined alone, while the other, derived from a ruby muscovite, showed much less darkening on calcination alone. The colors of the nacreous pigment end products were practically indistinguishable from each other. When this procedure was repeated but without aluminum silicate addition and the substitution therefor of an equivalent amount of the respective lot of mica, a marked difference in color of the coated end-product was evident.

In addition to the preferred muscovite or white mica, use is also contemplated of other forms of mica, such as biotite, phlogopite and related vermiculite as pigment substrates. To obtain these products in desired particles size ranges (all passing through a 200 mesh screen and about 90% through a 325 mesh screen), it is preferred that they, also, be water ground. Mica with a surface area of about 3 square meters per gram and with a reasonably uniform particle size is particularly suitable for use in nacreous pigments to be employed in paints, printing inks, plastics, rubber and coatings for paper, etc.

As already indicated, the quantity of aluminum compound used to control the darkening of mica on calcination can be varied over a rather wide range. Selection of the specific amount to be used will depend on a number of factors, including (a) the inherent darkening tendency of the particular grade of mica employed; (b) the depth of color desired in the end-product; (c) the temperature employed in the calcination, and (d) the nature of the aluminum compound selected.

The choice of the aluminum compound or mixtures of aluminum compounds is governed by considerations of cost and safety, solubility in the reaction medium, and compatibility with the equipment (e.g. corrosion effects). For example, in the preparation of a nacreous flake pigment by coating a mica substrate, use is preferred of a water-insoluble aluminum compound or mixture (e.g. china clay, aluminum silicate, aluminum oxide, etc.), which advantageously will be retained in the product throughout the subsequent operations through calcination. In such instance, the use of a water-soluble type of aluminum compound (e.g. alum, aluminum chloride, etc.), the major portion of which may be washed out of the product during subsequent operation and prior to the calcination, might prove less effective and desirable. Likewise, the use of water-insoluble aluminum compounds would be preferably to minimize possible corrosive effects on the equipment of manufacture.

Although the examples shown have not specified the nature of the equipment to be used in the calcination, it should be understood that the choice thereof is not a limiting factor. The calcination may be carried out in a static bed, on a belt conveyor, in a rotating kiln, or in any other equipment which can provide the required temperatures with the necessary control.

Other than the foregoing considerations, the only factors influencing the selection of materials and the conditions for the manufacture will be those affecting specific properties of the end-product. Thus, for example, where it is desired to preserve the maximum lustre and sparkle associated with the flaky mica, it is desirable that the amount of aluminum additive be restricted to a minimum consistent with the attainment of the required color. On the other hand, where it is desired to decrease the lustre, improve the opacity and attain maximum whiteness in the nacreous pigment prepared by coating the flake substrate, then the quantity of aluminum additive will be accordingly increased.

The temperature of calcination encompassed in this invention ranges from 600 to 1000° C. The duration of calcination can range from five minutes to one hour or longer, as desired, depending on the temperature used. Virtually all of the color change that the mica undergoes occurs during the first five minutes of calcination, and longer periods of calcination have shown to have little perceptible effect on the color of the product. Consequently, although periods of calcination in excess of five minutes are usually not required, they can be resorted to, if desired without detrimental effects.

This invention affords useful methods for inhibiting or controlling mica darkening on calcination, and particularly a means of color control of oxide-coated mica flakes which require calcination in their manufacture. Hence, the processor who must calcine the mica or a coated product derived therefrom to standardize the color of his end-product can do so much more easily than possible heretofore, and can eliminate the need for careful preselection of the mica stock in controlling desired color in the final product. The advantages are readily realizable in applying the invention to the preparation of nacreous pigments by the coating of mica flakes, in accordance with the disclosures of U.S. Patents 3,087,827; 3,087,828; 3,087,829 and 3,107,173.

For certain applications it proves desirable to modify the properties of the nacreous pigments prepared by coating the mica flakes with metallic oxides. The treatment with aluminum compounds, as herein contemplated and particularly with those which are insoluble in dilute sulfuric acid under the conditions of hydrolytically precipitating the hydrous oxide onto the flake substrate, is highly effective in this respect. Thus, the use of china clay or aluminum silicate, as outlined in the examples, reduces the sparkle and effectively delustres the resulting nacreous pigments, and, in addition, improves their hiding power and increases their whiteness. All these alterations tend to minimize the difference in properties between the synthetic nacreous pigments prepared by coating mica with metal oxides and naturally occurring pearl essence derived from fish scales, with the advantages in lightfastness, chemical resistance and cost which the synthetic product has over the natural pearl essence being preserved.

We claim:

1. A calcined color-stabilized mica product consisting essentially of a flake mica bearing from 1–50% by weight of a coating formed by calcination from an aluminum compound from the class consisting of the oxide, the silicate, the sulfate, and the halide, said percentages being calculated on the basis of $Al_2O_3$ equivalent.

2. A calcined, nacreous flake pigment consisting essentially of flake mica bearing from 1 to 50% by weight of a contiguous coating formed by calcination from an aluminum compound from the class consisting of the oxide, the silicate, the sulfate and the halide, said percentages being calculated on the basis of $Al_2O_3$ equivalent and an outer coating of a thin, adherent, non-opaque, translucent layer of an oxide from the class consisting of titanium, zirconium, iron and chromium.

3. The product of claim 2 wherein the aluminum compound is china clay.

4. The product of claim 2 wherein the aluminum compound is aluminum silicate.

5. The product of claim 2 wherein the metal oxide is $TiO_2$.

6. A process of inhibiting the darkening of mica on calcination at temperatures of 600–1000° C. comprising prior to undertaking said calcination directly mixing with said mica from 1–50% by weight of an aluminum compound from the class consisting of the oxide, the silicate, the sulfate, and the halide, and conducting said calcination while the mica is directly mixed with said aluminum compound.

7. The process of preparing nacreous flake pigments comprising depositing a metal hydrous oxide coating from the class consisting of titanium, zirconium, iron and chromium oxides on a substrate consisting of mica bearing on its surface a coating of from 1 to 50% by weight, based on the mica, of an aluminum compound from the class consisting of the oxide, the silicate, the sulfate and the halide and calcining the resulting coated product at a temperature of 600–1000° C.

8. The process of claim 7 wherein the hydrous oxide coating is hydrous $TiO_2$ and the aluminum compound is china clay.

9. The process of claim 7 wherein the metal hydrous oxide is hydrous $TiO_2$ and the aluminum compound is aluminum silicate.

References Cited

UNITED STATES PATENTS 3,087,828   4/1963   Linton             106—291

TOBIAS E. LEVOW, *Primary Examiner.*

JAMES E. POER, *Examiner.*

HELEN M. McCARTHY, *Assistant Examiner.*